Dec. 31, 1968   R. BERNARD   3,418,827
ASSEMBLIES OF THE ELASTIC COUPLING TYPE
Filed June 29, 1966   Sheet 3 of 3

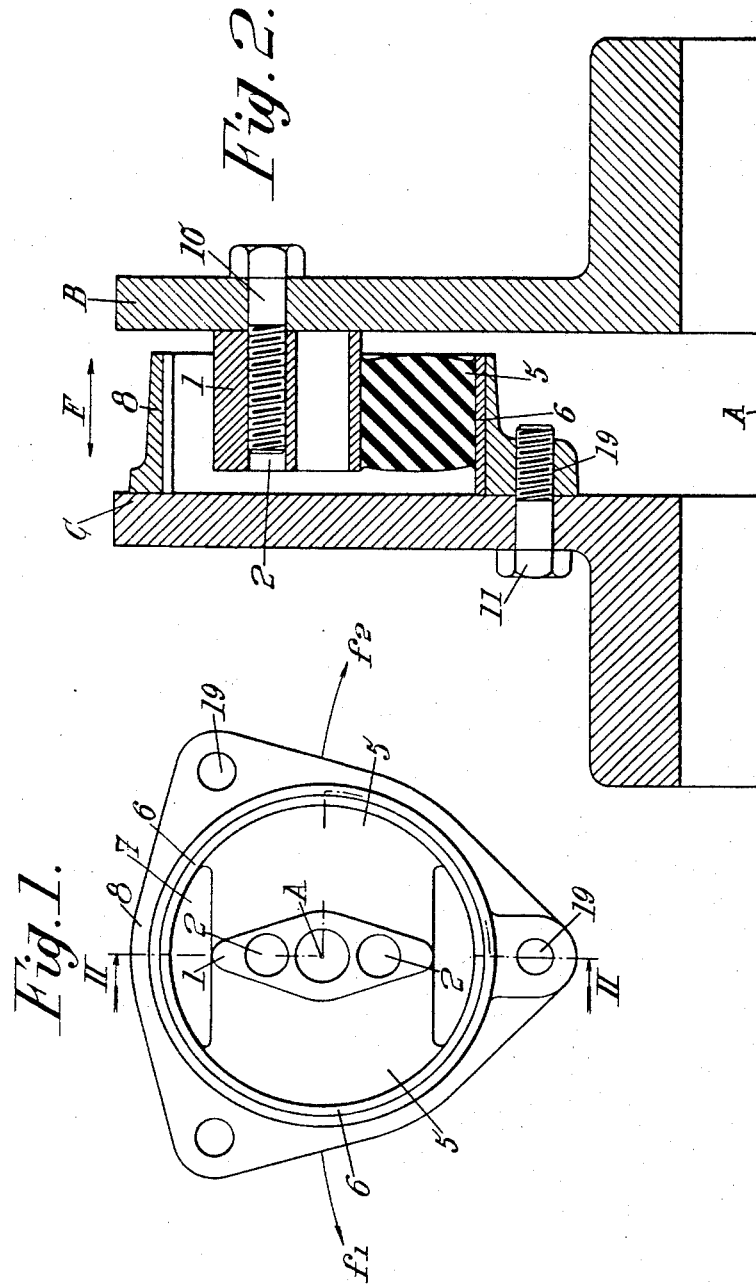

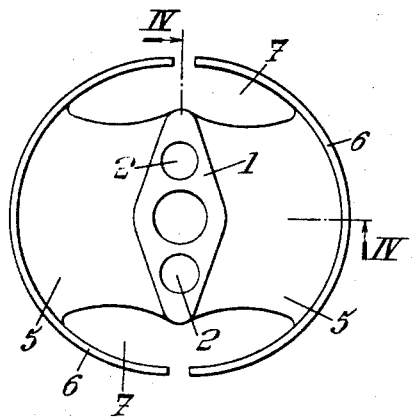
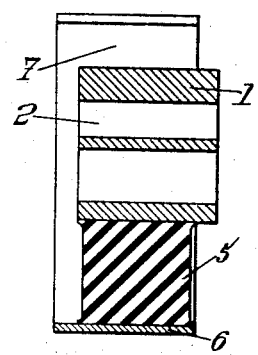
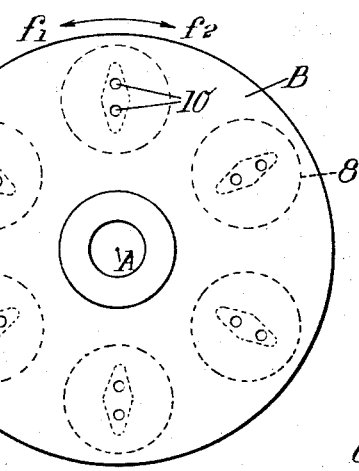
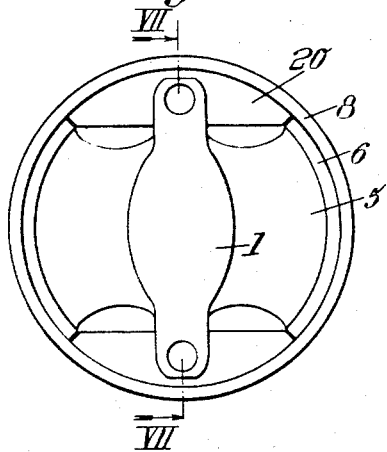
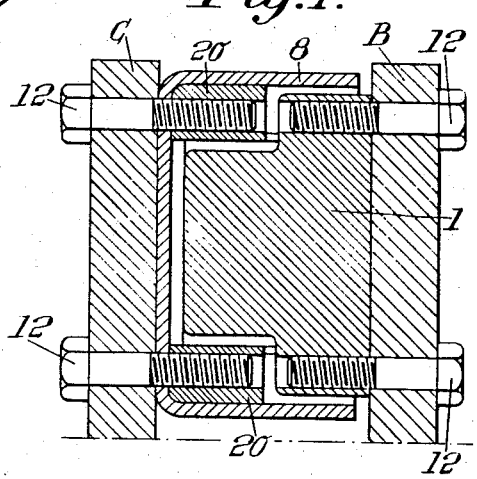

United States Patent Office 3,418,827
Patented Dec. 31, 1968

3,418,827
ASSEMBLIES OF THE ELASTIC
COUPLING TYPE
Raoul Bernard, Fontenay-aux-Roses, France, assignor to
Societe Paulstra, Levallois-Perret, France, a society of
France
Filed June 29, 1966, Ser. No. 561,463
Claims priority, application France, July 21, 1965,
25,488
9 Claims. (Cl. 64—11)

ABSTRACT OF THE DISCLOSURE

The elastic coupling is intended for coupling one rotatable member to another, and comprises a plurality of coupling units, each disposed eccentrically with respect to the two rotatable members. Each coupling unit comprises an inner element secured to one of the rotatable members, an outer element secured to the other rotatable member, and rubber masses, precompressed circumferentially with respect to the rotation of the two members, disposed between these two elements. The inner element has two outer sides disposed substantially radially with respect to the rotation of the two members, and the rubber masses project circumferentially outwardly from these two sides. The rubber masses are left free both radially inwards and outwards with respect to the rotation of the two members.

---

The present invention relates to assemblies of the elastic coupling type and more particularly to those using rubber blocks to connect two elements or devices one to the other. Such couplings are provided, for example, between a driving shaft and a driven shaft, using for this purpose two plates rigidly fixed to said shafts and connected one to the other by intermediate studs comprising rubber or other elastomeric elements.

It is known, especially when such couplings are intended to transmit considerable couples amounting, for example, to several hundred metres/kgs., to use for these couplings structures with several elastic elements, or studs, mounted in a ring concentric with the axis of the transmission.

Thus there are employed for this purpose, rubber blocks of various forms, inserted in staggered cavities of the driving and driven flanges, or of tubular elements mounted in one of the drive-plates and traversed by a pin fixed rigidly to the second plate.

These arrangements have the disadvantage of not being capable of dismantling either for uncoupling or to replace one or several of the elastic elements, without displacement of the machines and removal of the coupling completely, which presents serious disadvantages with powerful and therefore heavy machines.

There are also used elastic studs each constituted by a block of rubber adhered to two plain metallic plates generally circular and provided with threaded shafts for fixing to the coupling plates, said plates being in general radially slotted on the periphery to enable the radial and individual dismounting and remounting of the studs. In such a coupling, the rubber works in shear in all directions perpendicular to the axis of rotation; it presents therefore, the appreciable advantage of good elasticity in the direction of torque, and in the radial direction, thus tolerating relatively considerable disalignments of the coupling shafts. On the other hand, the rubber works obviously in compression-traction and thus with a relatively considerable stiffness in the direction parallel to the axis. In numerous applications where the coupling is subject to displacements or vibrations parallel to the axis, there results considerable stress which is often intolerable and responsible for deterioration of the seating blocks.

It is a principal object of the invention to provide assemblies and couplings comprising such assemblies, that overcome these disadvantages, that work under the best conditions and that are more easily dismantled than hitherto.

According to the invention there is provided an assembly of the elastic coupling type using rubber blocks for connecting one member to another, said assembly comprising a first armature adapted for attachment to said one member, a second armature adapted for attachment to said other member and internally of said first armature, and rubber elements adapted to be precompressed and located between said armatures.

In addition to this main feature there are provided certain other features which are preferably used at the same time and which are more explicitly described below.

According to a further aspect of the invention there are provided machines, elastic couplings and other applications, both fixed and mobile, incorporating these novel assemblies.

In order that the invention may be more clearly understood, several embodiments are described below, by way of non-limiting examples and with reference to the accompanying drawings wherein:

FIGURES 1 and 2 show respectively, in elevation and in a section taken at II—II of FIGURE 1 of an embodiment of an assembly in accordance with the invention for the elastic coupling of two plates;

FIGURES 3 and 4 show respectively in elevation and in section taken at IV—IV of FIGURE 3, the inner element of the embodiment of FIGS. 1 and 2;

FIGURE 5 shows schematically on a smaller scale and in elevation, a coupling according to the invention, using assemblies of the type shown in FIGURES 1 to 4;

FIGURES 6 and 7 show, similarly to FIGURES 1 and 2, another embodiment of an assembly and coupling according to the invention;

Figure 8:
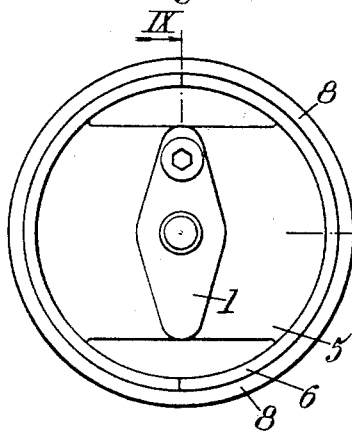
FIGURES 8, 9 and 10 show, respectively in elevation, in section taken at IX—IX of FIGURE 8 and in partial section taken at X—X of FIGURE 9, another embodiment of an assembly and coupling according to the invention.

The assembly according to the invention is especially useful to establish a coupling between a driving and a driven shaft arranged on their common axis A, this coupling being of the type of those comprising two plates B and C, fixed rigidly to said shafts and connected by elastic studs.

In the assemblies according to the invention, in addition to their mounting and their dismounting being facilitated, the rubber being submitted to a preliminary compression, this avoids their being submitted to an extension under the action of the coupling forces to which they are subjected.

Each assembly is constituted essentially by two elements, namely, an outer armature suitable for fixing rigidly to one of the plates B, C and an inner armature supporting, adhered thereto, two rubber masses, the assembly being such that, for the introduction of the second element into the first, it is necessary to compress the rubber previously.

In particular, the assembly is arranged in such fashion, after mounting, that the inner armature, substantially of planar form, is radially oriented, that is to say, in the direction of the axis A, the two rubber masses are adhered to both sides of the said armature occupying only a part of the spaces separating it from the outer armature.

The above-described masses are adhered also, towards the exterior, to intermediate armature elements, to facilitate mounting.

Referring now to the drawings:

In the embodiment of FIGURES 1 to 5, the inner element of each stud (FIGURES 3 and 4) comprise a central armaure 1 of substantially plane form, with means to permit it to be fixed, for example to plate B, means comprising especially two threadings 2 in which screws 10 can be screwed (FIGURE 2), the whole being arranged in such fashion that, in the mounted position, the armature 1 is located radially. On both sides of the latter are adhered rubber masses 5, which, besides, are adhered to the intermediate armatures 6, in the form of semicylinders, symmetrical with respect to the middle plane of the armature 1 and not placed edge to edge.

In the free position, before mounting in the outer armature which is under consideration, there is then a play between the extremities of the intermediate armatures. Furthermore, there exists free spaces 7 to give to the rubber a certain freedom of deformation. It is thus possible to compress the rubber masses, in bringing together the semiarmatures 6 to form the circle.

The inner element or armature thus defined, is thus made to coact, in FIGURE 1, with an outer element or outer armature 8 in the form of a bell, having a cylindrical bore, of such type that it is possible, having compressed the rubber, to render edge to edge the semiarmatures 6, to introduce therein the said inner element, the semiarmatures 6 being then supported against the internal cylindrical surface of the outer armature 8 and the whole remaining in this state of precompression.

Each block is prepared thus, in the workshop, and if necessary, fixing, by welding or otherwise, can be included between the two sets of armatures.

The bell 8 is provided, like the central armature, with holes or threadings 19 which permit its fixing on the corresponding plate, here the plate C, with the aid, for example of bolts 11 (FIGURE 2).

In a general manner, each block being prepared in the workshop, with suitable reciprocal orientations of the two armatures 1 and 8, it will be easy to ensure the mounting of the various blocks on the plates B and C, with the aid of bolts 10 and 11, and, similarly to effect their dismounting, without the necessity of displacing the plates.

The precompression of the rubber provides various advantgaes and especially enables it to resist better the heavy forces which can be applied to it.

In fact, under the action of the couple applied to the assembly of the complete coupling (FIGURE 5), one of the two rubber masses 5 supports the corresponding compressive force, the other having the tendency to expand. The precompression indicated above is such that, under the action of the higher coupled envisaged for the coupling, total decompression of one of the masses 5 cannot occur, so that the rubber is never subjected to traction (which is to be avoided, particularly to retain good adherence).

It should be understood that the stud being symmetrical, the coupling forces can be applied in one direction or the other.

For all the forces resulting from the action of the couple, (arrows $f_1$ and $f_2$, FIGURES 1 and 5) the rubber works in compression, under optimum conditions to support considerable stress.

In the direction of the arrow F (FIGURE 2), the rubber works in shear, thus under the best conditions of flexibility and gives rise to minimal reactions for all displacement parallel to the axis A.

Starting from the embodiment which has just been described, there may be conceived many others, which can be varied particularly relative to the method of fixing the studs to the plates B and C.

In the embodiment of FIGURES 6 and 7, the fixing is achieved by the aid of screws 12 which are placed face to face, respectively, with respect to plates B and C, which helps to facilitate the machining of the latter.

The screws 12 of plate C are screwed on to the respective segments 20 against the extremities to which will be abutted the corresponding extremities of the intermediate armature 6 which here occupy only a part of the semicircle.

Figure 9:
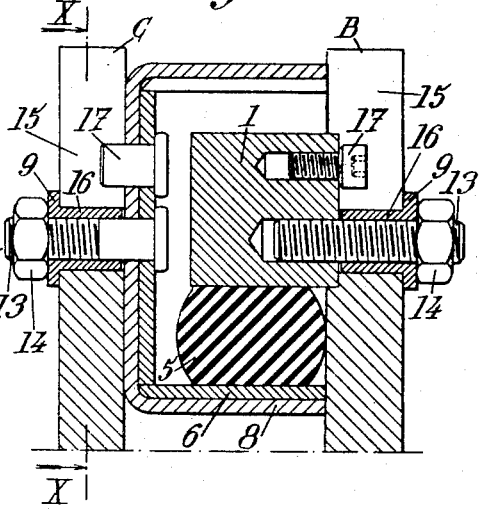
Figure 10:
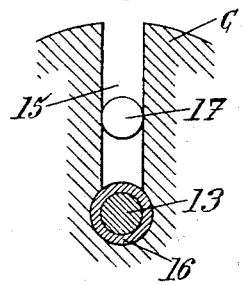

In the embodiment of FIGURES 8 to 10, fixing is provided to plates B and C at a single point, for example along the axis of the studs, by bolts or pins 13.

To facilitate the mounting and dismounting, there may be provided in plates B and C, grooves 15 permitting the radial dismounting, in combination with nipples 17 which ensure the correct orientation of the stud. The pressure of the nuts 14 on the edges of the grooves is ensured by sleeves 16 with a shoulder 9.

Figure 11:
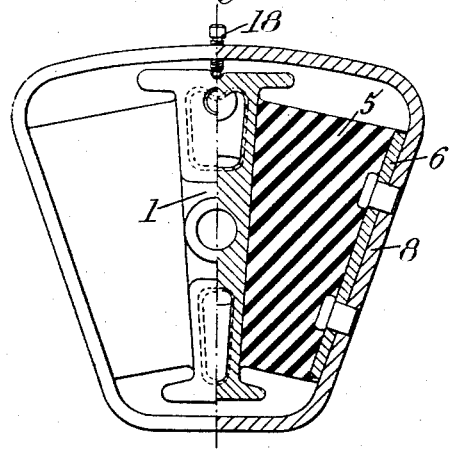
FIGURE 11 shows similarly to FIGURE 1, another embodiment of an assembly according to the invention.

Finally, there is illustrated in FIGURE 11 the fact that the circular form, obviously the simplest, adopted in the previous examples, is not essential; one can notably choose a triangular form or preferably trapezoid, such as is shown in FIGURE 11, particularly for the most advantageous use of the available space.

In this case, the two armatures 6 may be planar and are no longer parallel to the armature 1. To avoid the armature 1 being displaced towards the exterior at the moment of compression of the rubber, it is abutted by two screws 18, which are unscrewed and removed after the placing in position of the stud between the plates B and C.

From the foregoing description, it will be clear that the invention is not limited in any way to embodiments and applications thereof described, but that modifications may be made therein, without departing from the scope of the invention.

What I claim is:

1. An elastic coupling for connecting one rotatable member to another rotatable member, said coupling comprising a plurality of coupling units, each said coupling unit comprising:
    an inner element having two outer sides, said inner element being adapted to be secured to one of said rotatable members, eccentrically with respect to said one rotatable member, with said two outer sides disposed substantially radially with respect to the rotation of said two members,
    a rubber mass projecting outwardly from each of said outer sides of said inner element circumferentially with respect to the rotation of said two members,
    an outer element adapted to be secured to the other rotatable member, eccentrically with respect to said other rotatable member, and adapted to receive therein said inner element and said rubber masses, said rubber masses being received in said outer element under precompression circumferentially with respect to the rotation of said two members, and said rubber masses being left at least partially free both radially inwards and radially outwards with respect to the rotation of said two members.

2. An elastic coupling according to claim 1 in which each elastic coupling unit includes two intermediate elements disposed in said outer element between said outer element and said two outwardly projecting rubber masses respectively.

3. An elastic coupling according to claim 2 in which, in each elastic coupling unit, each rubber mass is adhered both to the inner element and to one intermediate element.

4. An elastic coupling according to claim 2 in which, in each elastic coupling unit, said outer element is in the form of a cylinder, and said intermediate elements are in the form of portions of a corresponding cylinder adapted to fit in said outer element.

5. An elastic coupling according to claim 2 in which, in each elastic coupling unit, screw threads are provided in said inner and outer elements for securing them, by means of bolts, to their corresponding rotatable members.

6. An elastic coupling according to claim 2 in which, in each elastic coupling unit, said inner and outer elements are secured at their centers to said rotatable members respectively, by means of bolts, and radial grooves are provided in said rotatable members for said bolts to facilitate securing and removing said coupling unit.

7. An elastic coupling according to claim 2 in which, in each elastic coupling unit, each of said two sides of said inner element is substantially plane.

8. An elastic coupling according to claim 2 in which, in each elastic coupling unit, said inner element has a cross-section of trapezoidal form.

9. An elastic coupling according to claim 1 in which said rotatable members are plates rigid with a driving shaft and a driven shaft respectively, said shafts being coaxial with each other.

References Cited

UNITED STATES PATENTS

| 2,157,996 | 5/1939 | Brownstein | 64—14 |
| 2,421,134 | 5/1947 | Venditty | 64—14 |
| 2,460,628 | 2/1949 | Fawick | 64—11 |
| 2,514,897 | 7/1950 | Paulsen | 64—14 |
| 2,565,606 | 8/1951 | Guy | 64—11 |
| 2,969,657 | 1/1961 | McGavern | 64—11 |
| 3,199,313 | 8/1965 | Paulsen | 64—11 |

HALL C. COE, *Primary Examiner.*

U.S. Cl. X.R.

64—27